United States Patent [19]

Hashiguchi et al.

[11] Patent Number: 5,261,084
[45] Date of Patent: Nov. 9, 1993

[54] ERROR JUDGMENT METHOD

[75] Inventors: Tatsuro Hashiguchi; Atsushi Takahashi, both of Tokyo, Japan

[73] Assignee: NEC Corporation, Tokyo, Japan

[21] Appl. No.: 911,792

[22] Filed: Jul. 10, 1992

Related U.S. Application Data

[63] Continuation of Ser. No. 346,410, May 2, 1989, abandoned.

[30] Foreign Application Priority Data

May 6, 1988 [JP] Japan ................. 63-108922

[51] Int. Cl.$^5$ .............................. G06F 11/28
[52] U.S. Cl. ..................... 395/575; 364/DIG. 2; 364/943.9; 364/944.91; 364/945.7; 371/40.1
[58] Field of Search ............... 371/40.1, 40.2, 40.3, 371/40.4; 395/425, 575

[56] References Cited

U.S. PATENT DOCUMENTS

| | | | |
|---|---|---|---|
| 4,006,466 | 2/1977 | Patterson et al. | 395/275 |
| 4,090,239 | 5/1978 | Twibell et al. | 395/550 |
| 4,223,382 | 9/1980 | Thorsrud | 395/575 |
| 4,322,812 | 3/1982 | Davis et al. | 395/425 |
| 4,519,032 | 5/1985 | Mendell | 395/425 |
| 4,631,670 | 12/1986 | Bradley et al. | 395/725 |
| 4,656,578 | 4/1987 | Chilinski et al. | 395/375 |
| 4,955,023 | 9/1990 | Tanimoto | 371/40.1 |

*Primary Examiner*—Debra A. Chun
*Attorney, Agent, or Firm*—Foley & Lardner

[57] ABSTRACT

In a method of judging a data memory access error in an information processing apparatus, the data memory access error flag is set in the process state register upon occurrence thereof, and an error flag in the process state register is set until updating of the process state register and until clearing by a software instruction. The data memory access errors are stored in the general registers in units of operation levels, and data memory access error judging is executed upon detection of the error flag under the control of software.

1 Claim, 3 Drawing Sheets

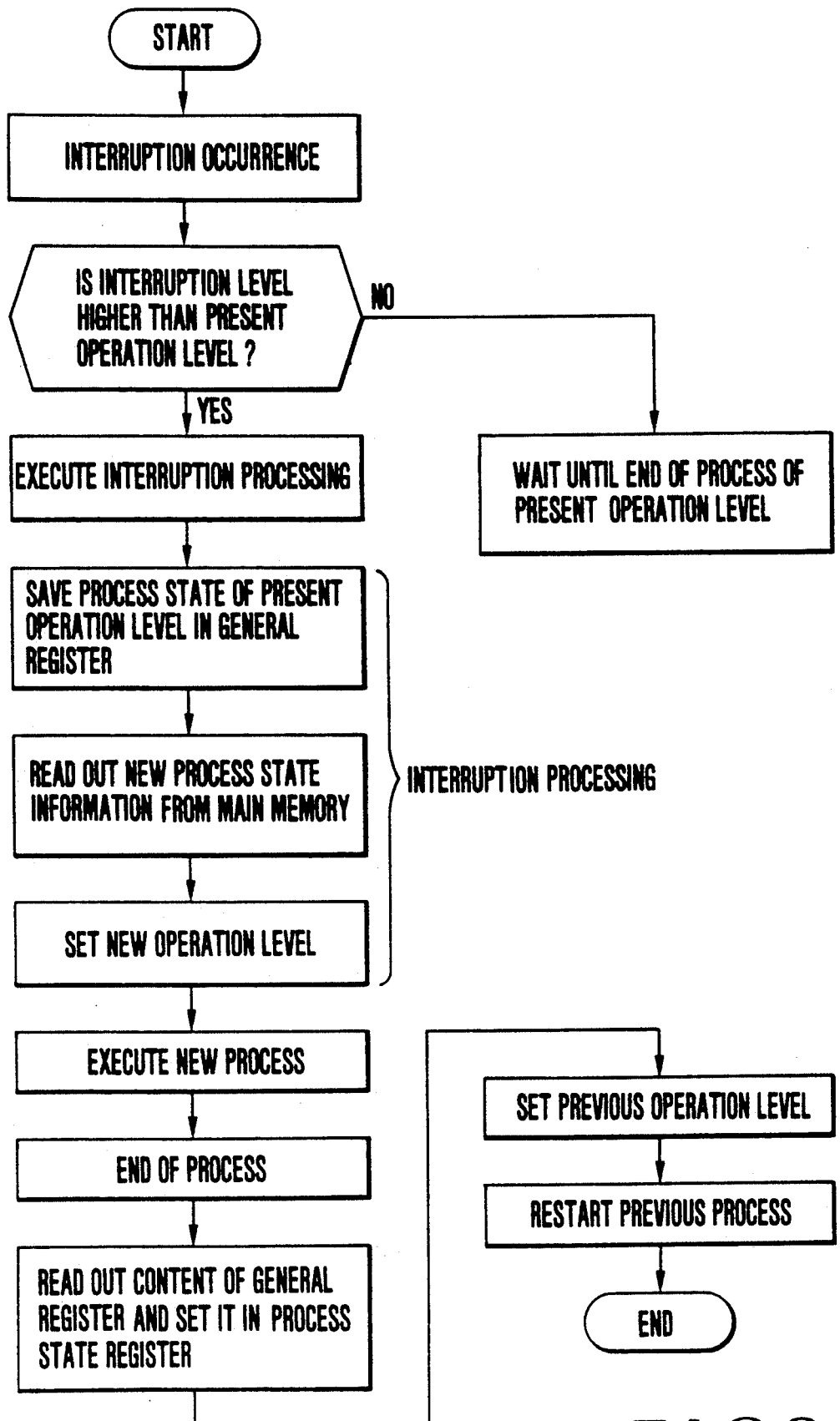
F I G.3

500000

ERROR JUDGMENT METHOD

This application is a continuation of application Ser. No. 07/346,410, filed May 2, 1989, abandoned.

BACKGROUND OF THE INVENTION

The present invention relates to an error judging method in an information processing apparatus capable of accessing a data memory different from a main memory for storing operation control software, and having a plurality of operation levels for executing processes associated with interruption processing and a set of general registers arranged in units of operation levels to switch processes upon an interruption operation, for saving the content of a process state register for storing a present process state into a corresponding general register when the present operation level is changed into a new operation level, and for restarting the previous process in accordance with the content of the general register and, more particularly, to a method of judging an error occurring when the information processing apparatus accesses the data memory.

A method of judging an access error of a data memory and level change processing in a conventional information processing apparatus of this type will be described below.

In a conventional information processing apparatus, when a uncorrectable error is detected upon access of the main memory for storing operation control software, the operation of the information processing apparatus is stopped. However, when a data memory access error is detected, the present software processing is automatically interrupted and transferred to an exceptional processing program under the control of hardware/firmware of the information processing apparatus.

The term "exceptional" indicates a condition detected by the information processing apparatus, such that the present process cannot be continued any longer. When hardware/firmware of the information processing apparatus detects the data memory access error, information stored in the process state register, necessary for continuation of the process, is saved in the main memory. Control is automatically transferred to the exceptional processing program, and predetermined exceptional processing is performed.

Level change processing by an interruption operation will be described. A plurality of operation levels for operating processes associated with an interruption operation are available in the information processing apparatus. When an interruption request for an operation of a higher level is received during operation at a given level, the present process is interrupted, and the process of a higher level is started in response to the interruption request.

Level change processing will be described with reference to FIG. 2. The information processing apparatus comprises a priority control unit 11 for determining whether an interruption level is higher than the present operation level upon generation of an interruption signal, a level indicating unit 16 which represents the present operation level, and a set of general registers 9 respectively corresponding to operation levels to perform process switching by the interruption signal.

When an interruption signal is generated during an operation at a given level and the priority control unit 11 determines that the interruption level is higher than the present operation level, a fixed address of firmware is detected under hardware control, and interruption processing is executed.

Firmware microinstructions are stored in a control memory (CSM) 13. A microinstruction read out from the control memory 13, and then stored in a control register (CSR) 14, is executed by an FW control unit 15.

In interruption processing, the process state of the present operation level, i.e., PSR data stored in a process state register (PSR) 1, is saved in the corresponding general register 9. Process state information required for a new process is read out from a main memory 17 and stored in the process state register 1. The content of the level indicating unit 16 is updated to a level corresponding to the interruption signal, and the new process is started.

In order to restore the previous process at the end of the new process, the content of the general register is read out and stored in the process state register 1. The content of the level indicating unit 16 is set at the previous operation level, and, therefore, the previous level is restarted.

The above description is concerned with the general operation of level change processing, and a schematic flow chart for the level change is shown in FIG. 3.

As described above, in the conventional information processing apparatus, when the data memory access error is detected, exceptional processing is automatically executed under the control of hardware/firmware. Therefore, control by software cannot be performed. When an access error of the main memory which stores software instructions is detected, systemdown of the information processing apparatus inevitably occurs. However, the data memory access error is detected, the exceptional processing program is executed independently of software control. As a result, the present process is interrupted.

SUMMARY OF THE INVENTION

It is a further object of the invention to provide an error handling method wherein interruption of the present process beyond software control can be prevented, and control transfer from the present process to exceptional processing can also be prevented.

It is another object of the present invention to provide an error handling method wherein the presence/absence of a data memory access error need not be detected every access cycle, and access error data are saved and handled in units of operation levels.

BRIEF DESCRIPTION OF THE DRAWINGS

FIG. 3 is a flow chart for explaining level change processing in the conventional arrangement.

DESCRIPTION OF THE PREFERRED EMBODIMENT

The present invention will be described with reference to FIG. 1.

Figure 1:
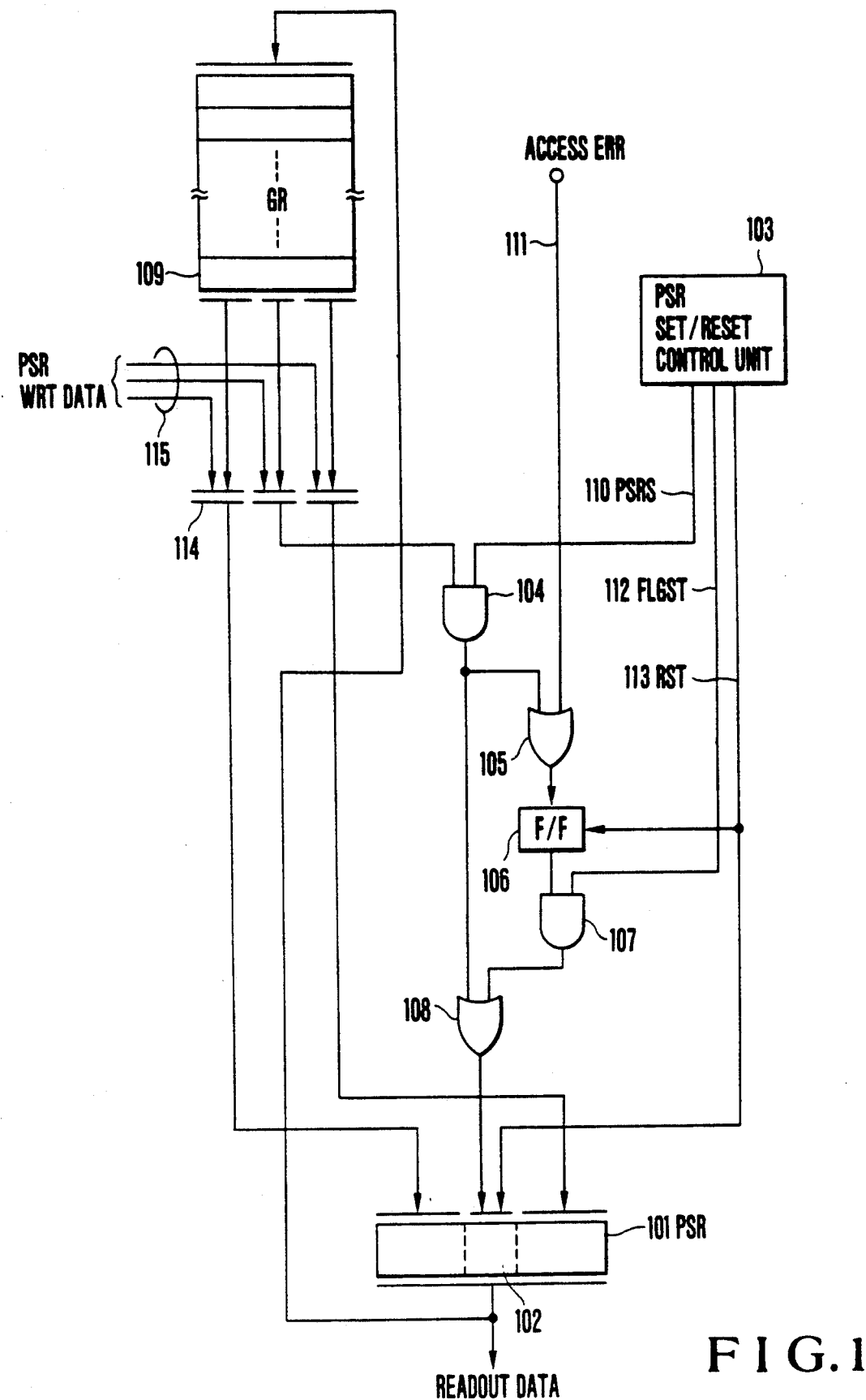
FIG. 1 is a block diagram showing an arrangement of an information processing apparatus which employs an error judging method according to an embodiment of the present invention.
Figure 2:
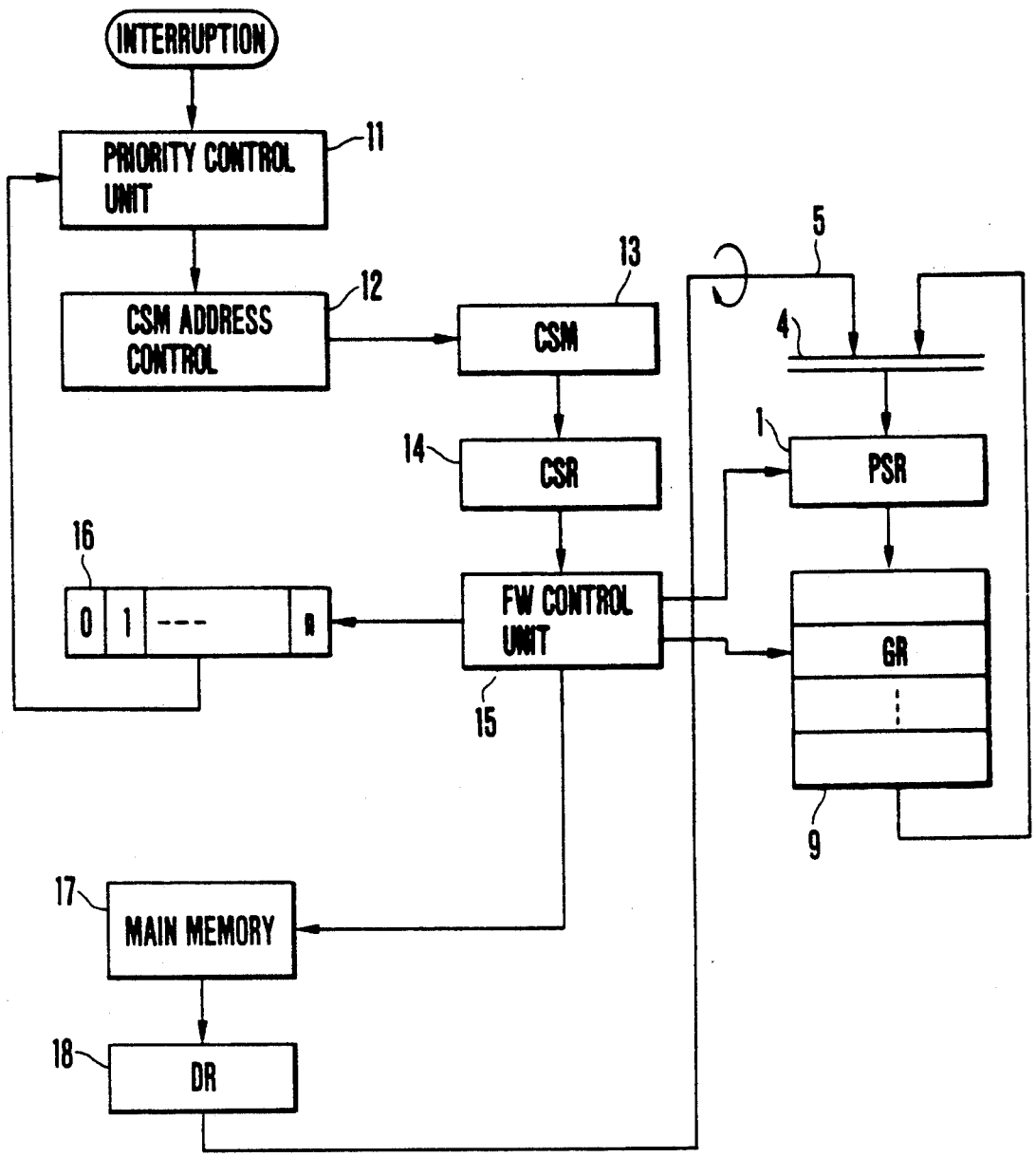
FIG. 2 is a block diagram showing a conventional arrangement for performing level change processing.

FIG. 1 shows a typical arrangement of an information processing apparatus which employs an error judging method according to an embodiment of the present invention. In this embodiment, an error flip-flop (F/F) 106 is connected to an error flag 102 through an AND gate 107 and an OR gate 108 to prevent updating of a value of the error flag 102 in a process state register (PSR) 101 upon every data memory access.

A signal 111 is a data memory access error representative (ACCESS ERR) and is unconditionally set by the error F/F 106 upon occurrence of an error.

A data memory access instruction always sets an output from the error F/F 106 in the error flag 102 in the process state register 101. In practice, an error F/F output setting condition signal (FLGST) 112 is set at logic "1" by control of hardware/firmware which decodes the software instruction, i.e., control by a PSR set/reset control unit 103. When an output from the error F/F 106 is set at logic "1", an output from the AND gate 107 is set at logic "1", and the error flag 102 in the process state register 101 is set at logic "1". The data memory access error is set in the error F/F 106 and the error flag 102.

At the time of updating of the process state register 101, a PSR write data setting instruction (PSRS) 110 from the PSR set/reset control unit 103 is set at logic "1" under firmware control. An output from an AND gate 104 is simultaneously set in the error F/F 106 and the error flag 102 through an OR gate 105 and the OR gate 108.

Under the above control, information of the error flag 102 at the time of a level change by an interruption operation can be retained. In interruption processing, information to be set from the main memory to the process state register 101 at the time of a level change, i.e., PSR write data (PSR WRT DATA) 115 is read out in the same manner as in the conventional case. The readout information is written in the process state register 101. At this time, logic "0" is simultaneously written in the error F/F 106 and the error flag 102. When the process associated with the interruption operation is completed and the previous process is to be restored, the previous process state stored in a general register (GR) 109 is read out and then stored in the process state register 101 through a switching circuit 114. When a data memory access error is detected in the previous process and the error flag 102 is set logic "1", the value returned from the general register 109 is also logic "1". Logic "1" is simultaneously set in the error flag 102 and the error F/F 106.

The error processing program (software) simultaneously clears the error F/F 106 and the error flag 102 under the control of the PSR set/reset control unit 103.

The error F/F 106 holds its content except for a reset instruction (RST) 113 from the PSR set/reset control unit 103 and data write access by the PSRS 110. The error flag 102 which is set every data memory access cycle retains the same value until error judging is completed and the error F/F 106 is cleared.

Software can determine the presence/absence of the data memory access error by reading the content of the process state register 101. When an error is detected, the present process is transferred to an error handling program under its own control. For instance, the information processing apparatus, when reading data from a data memory, reads four bytes in each data read. If the existence or non-existence of a data memory access error is judged each time data is read in a unit of four bytes, the reading time will increase in comparison with the amount of data read when a large quantity of data is read from the data memory. This will slow down the processing speed of the information processing apparatus.

In order to preclude such deceleration, the software does not judge the existence of an error in each unit. Rather, it reads the PSR after all of the large amount of data is read, and judges the value of the data memory access error flag on the PSR. When there is an error, the software judges that the data read was a failure.

The present invention has been described in the preferred embodiment and is not limited thereto.

According to the present invention as has been described above, when an error upon accessing of a data memory independently of the main memory by the information processing apparatus is detected, the conventional processing for automatically executing the exceptional processing under the control of hardware/firmware is not performed. The error is set in the error flag in the process state register for storing a process state even after the operation level is changed, and this state is determined by software, thereby performing error judging. Even if the level is changed by interruption processing, data memory access error information is held at the same operation level as that used upon occurrence of the error. In other words, the data memory access error information can be stored in units of operation levels. The presence/absence of the error need not be determined every access cycle, and the error information is saved and handled. In addition, interruption of the present process beyond the control of software can be prevented, and automatic transfer control from the present process to exceptional processing can also be prevented.

What is claimed is:

1. A method of judging a data memory access error in an information processing apparatus capable of accessing a data memory different from a main memory for storing operation control software, and having a plurality of operation levels for executing processes associated with interruption processing and a set of general registers arranged in units of operation levels to switch processes by an interruption operation, comprising the steps of:

setting a data memory access error flag in the process state register upon occurrence of a data memory access error, and holding the data memory access error flag in the process state register until updating of the process state register when the operation level is changed by an interruption operation or until executing a software instruction of read and clear the process state register;

storing the data memory access error flag in one of the general registers in units of operation levels at the occurrence of an operation level change from a first operation level to a second operation level;

reloading the process state register from the general registers after the first operation level is resumed; and judging that an access error has occurred upon detection of the error flag in the process state register that read the instruction of read and clearing the process state register.

* * * * *